United States Patent
Watanabe et al.

(10) Patent No.: US 7,110,038 B2
(45) Date of Patent: Sep. 19, 2006

(54) IMAGE SIGNAL PROCESSOR EMPLOYING VOLTAGE REGULATORS TO DECREASE OVERALL POWER CONSUMPTION

(75) Inventors: Tohru Watanabe, Ogaki (JP); Takashi Tanimoto, Gifu-ken (JP); Tatsuya Takahashi, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 658 days.

(21) Appl. No.: 10/208,141

(22) Filed: Jul. 30, 2002

(65) Prior Publication Data

US 2003/0025823 A1 Feb. 6, 2003

(30) Foreign Application Priority Data

Aug. 1, 2001 (JP) ............................. 2001-233808
Apr. 11, 2002 (JP) ............................. 2002-109415

(51) Int. Cl.
H04N 5/225 (2006.01)
(52) U.S. Cl. .................................................. 348/372
(58) Field of Classification Search ............. 348/222.1, 348/372
See application file for complete search history.

(56) References Cited

U.S. PATENT DOCUMENTS 5,493,409 A * 2/1996 Maeda et al. ............... 358/296
5,963,255 A 10/1999 Anderson et al.
6,236,262 B1 5/2001 Mellot
6,377,073 B1 4/2002 Krasnansky
6,856,352 B1 2/2005 Kijima
2003/0043287 A1* 3/2003 Kakiuchi et al. ............ 348/269
2003/0200473 A1* 10/2003 Fung .......................... 713/320
2003/0218690 A1 11/2003 Sakaegi
2004/0120690 A1 6/2004 Takeshita et al.

FOREIGN PATENT DOCUMENTS

JP 02-248170 10/1990

OTHER PUBLICATIONS

"TLC876M Analog-To-Digital Converters" Texas Instruments SLAS140E—Jul. 1997—Revised Oct. 2000.

* cited by examiner

*Primary Examiner*—Ngoc-Yen Vu
*Assistant Examiner*—Adam L. Henderson
(74) *Attorney, Agent, or Firm*—Fish & Richardson P.C.

(57) ABSTRACT

A signal processor for reducing power consumption. The signal processor includes a first regulator for generating a first regulated voltage with a power supply voltage and supplying the first regulated voltage to a signal processing circuit. A second regulator generates a second regulated voltage with the power supply voltage and supplies the second regulated voltage to an output circuit. The second regulator shifts the second regulated voltage in accordance with a change in an input level of the external device.

12 Claims, 6 Drawing Sheets

IMAGE SIGNAL PROCESSOR EMPLOYING VOLTAGE REGULATORS TO DECREASE OVERALL POWER CONSUMPTION

BACKGROUND OF THE INVENTION

The present invention relates to an image signal processor for performing a predetermined signal processing on an image signal output from a solid-state imaging device to generate an image signal complying with a predetermined format.

An imaging apparatus using a solid-state imaging device (CCD image sensor), such as a digital still camera, often uses a battery as a power supply. The range of the output voltage of a battery is limited. Therefore, a regulator or a booster is employed to drive the CCD image sensor.

FIG. 1 is a schematic block diagram of a prior art imaging apparatus 50. The imaging apparatus 50 includes a regulator 2, a CCD image sensor 3, a drive device 4, and an image signal processor 7.

The regulator 2 is supplied with power supply voltage from a battery. The regulator 2 converts the power supply voltage to a predetermined voltage VK. The imaging apparatus 50 is operated with the same operational voltage VK, which is generated by the regulator 2.

The CCD image sensor 3 is, for example, a frame transfer type, and includes an imaging section 3a, a charge section 3b, a horizontal transfer section 3c, and an output section 3d. The imaging section 3a has a matrix of light receiving pixels. Each light receiving pixel accumulates information charges generated in response to a received imaging subject. The charge section 3b temporarily stores the information charges corresponding to a single screen image that is retrieved from the imaging section 3a. The horizontal transfer section 3c sequentially retrieves the information charges from the charge section 3b and sequentially transfers the information charges in the horizontal direction in units of single pixels. The output section 3d receives information charges from the horizontal transfer section 3c, converts the information charges in units of single pixels to voltage values corresponding to the information charges, and generates an image signal Y(t). The image signal Y(t) is provided to the signal processor 7.

The drive device 4 includes a booster 5 and a vertical driver 6, which are formed on the same semiconductor substrate. The booster 5 includes a positive voltage generating charge pump and a negative voltage generating charge pump. The positive voltage generating charge pump increases the regulated voltage VK to a predetermined positive voltage VOH (e.g., 5V) and supplies the positive voltage VOH with the CCD image sensor 3. The negative voltage generating charge pump boosts the voltage to a predetermined negative voltage VOL (e.g., −5V) and supplies the negative voltage VOL with the vertical driver 6.

The vertical driver 6 operates with the negative voltage VOL and generates a frame transfer clock signal of and a vertical transfer clock signal øv. The clock signals øf and øv are respectively provided to the imaging section 3a and the charge section 3b of the CCD image sensor 3. The frame transfer clock signal øf and the vertical transfer clock øv are generated in accordance with a frame shift timing signal FT, a vertical synchronizing signal VT, and a horizontal synchronizing signal HT, which are provided from the timing control circuit 13 of the signal processor 7. The information charges that are accumulated in the imaging section 3a are frame-transferred to the charge section 3b at a timing that is in accordance with the frame shift timing signal FT. The information charges that are held in the charge section 3b are line-transferred to the horizontal transfer section 3c at a timing that is in accordance with the vertical synchronizing signal VT and the horizontal synchronizing signal HT.

The signal processor 7 includes a horizontal driver 8, a signal processing circuit 9, a timing control circuit 13, and an output circuit 14, which are formed on the same semiconductor substrate.

The horizontal driver 8 operates with the regulated voltage VK and generates a horizontal transfer clock signal øh. The horizontal transfer clock signal øh is provided to the horizontal transfer section 3c of the CCD image sensor 3. The horizontal transfer clock signal øh is generated in accordance with the vertical synchronizing signal VT and the horizontal synchronizing signal HT, which are provided from the timing control circuit 13. The information charges retrieved in the horizontal transfer section 3c are horizontally transferred at a timing that is in accordance with the horizontal synchronizing signal HT and converted to an image signal Y(t) by the output section 3d.

The signal processing circuit 9 includes an analog processing circuit 10, an A/D converter 11, and a digital processing circuit 12. Further, the signal processing circuit 9 operates with the regulated voltage VK, which is supplied by the regulator 2. The analog processing circuit 10 receives an image signal Y(t) from the CCD image sensor 3 and performs analog signal processing, such as a correlated double sampling (CDS) process and an automatic gain control (AGC) process, on the image signal Y(t). In the CDS process, the image signal Y(t), which repeats the reset level and the signal level, is clamped at the reset level. Subsequently, the signal level is extracted from the image signal Y(t) and an image signal having a continuous signal level is generated. In the AGC process, the image signals retrieved in the CDS process are integrated in units of single image screens or single vertical scan terms. The gain is feedback-controlled so that the integrated data is included in a predetermined range. The A/D converter 11 receives an image signal from the analog processing circuit 10, standardizes the image signal in synchronism with the image output timing of the CCD image sensor, and generates a digital image data signal Y(n). The digital image data Y(n) is provided to the digital processing circuit 12.

The digital processing circuit 12 performs processes such as color separation and a matrix operation on the digital image signal Y(n) to generate image data signal Y'(n), which includes a luminance signal and a chrominance signal. For example, in the color separation process, the digital processing circuit 12 separates the image data Y(n) in accordance with a color array of a color filter, which is attached to the imaging section 3a of the CCD image sensor 3, to generate a plurality of color component signals. In the matrix operation process, the digital processing circuit 12 generates the luminance signal by synthesizing the separated color components and generates the chrominance signal by subtracting luminance components from each color component.

The timing control circuit 13 includes a plurality of counters (not shown), which count a reference clock signal CK that has a constant cycle, and determines a vertical scan and horizontal scan timing of the CCD image sensor 3. The timing control circuit 13 divides the reference clock signal CK, which is provided via a clock supply terminal (not shown), to generate the frame timing signal FT, the vertical synchronizing signal VT, and the horizontal synchronizing signal HT. The timing control circuit 13 provides the analog processing circuit 10, the A/D converter 11, and the digital processing circuit 12 with a timing signal to synchronize the operations of the A/D converter 11 and the digital processing circuit 12 with the operational timing of the CCD image sensor 3.

The output circuit 14 operates with the regulated voltage VK, receives the image data signal Y'(n) from the digital processing circuit 12 of the signal processing circuit 9, and provides the image data signal Y'(n) to external device including a central processing unit (CPU) 16, a memory 17, or a display driver 18, via a system bus 15. The CPU 16 centrally controls the operations of the imaging apparatus 50, the memory 17, and the display driver 18 in response to commands from peripheral devices. The memory 17 is a removable memory (e.g., memory card or flash memory) or a fixed memory, such as a hard disk, and stores image data signal Y'(n), which is provided from the imaging apparatus 50. The display driver 18 receives the image data signal Y'(n) from the imaging apparatus 50 and drives the display panel 19 to display a reproduced image.

In the signal processor 7 of the imaging apparatus 50, after the regulator 2 regulates the power supply voltage VDD from the battery to the predetermined regulated voltage VK, the regulated voltage Vk is commonly supplied to every circuit of the signal processor 7. Thus, the circuits of the signal processor 7 are supplied with the same power supply voltage. The value of the regulated voltage Vk is set in accordance with the operational voltage of the output circuit, which is normally greater than the operation voltage of the signal processing circuit 9. Therefore, even though the signal processing circuit 9 is operated by the power supply voltage, which is less that the regulated voltage VK, the signal processing circuit 9 is supplied with the regulated voltage VK, which is greater than the operational voltage. As a result, the signal processing circuit 9 redundantly consumes power. This may increase the power consumption of the imaging apparatus 50.

The regulator 2 supplies the constant regulated voltage VK. Thus, the voltage supplied to the signal processing circuit 9 and the output circuit 14 is constant. However, the signal processing circuit 9 and the output circuit 14 do not necessarily have to be supplied with the same power supply voltage. It is required that the operation voltage of the output voltage be in correspondence with the voltage of a system bus. Therefore, when the external device connected to the system bus change, the voltage level of the system bus also changes. To cope with a change of the external device, the regulator must be exchanged with a regulator that corresponds to the input level of the external device subsequent to the change. Accordingly, a plurality of regulators having different output voltages must be prepared for exchanging the regulator.

SUMMARY OF THE INVENTION

It is an object of the present invention to provide an image signal processor that reduces power consumption.

To achieve the above object, the present invention provides an image signal processor for performing a predetermined signal processing on a first image signal, which is generated by a solid-state imaging device, and generating a second image signal, which is provided to an external device and complies with a predetermined format. The image signal processor includes a first regulator supplied with a power supply voltage to generate a first regulated voltage, which is in accordance with an output level of the solid-state imaging device. A second regulator is supplied with the power supply voltage to generate a second regulated voltage, which corresponds to an input level of the external device. The second regulator shifts the second regulated voltage in accordance with the input level of the external device. A signal processing circuit is connected to the solid-state imaging device and the first regulator and operates with the first regulated voltage. The signal processing circuit performs the predetermined signal processing on the first image signal and generates the second image signal. An output circuit is connected to the second regulator and the signal processing circuit and operates with the second regulated voltage. The output circuit receives the second image signal from the signal processing circuit and provides the second image signal to the external device.

A further perspective of the present invention is a method for supplying power supply voltage to an image signal processor. The image signal processor includes a signal processing circuit for performing a predetermined signal processing on a first image signal, which is generated by a solid-state imaging device, to generate a second image signal, which complies with a predetermined format, and an output circuit for receiving the second image signal from the signal processing circuit and providing the second image signal to an external device. The method includes generating a first regulated voltage that is in accordance with an output level of the solid-state imaging device with the power supply voltage, supplying the first regulated voltage to the signal processing circuit, generating a plurality of divided voltages with the power supply voltage, selecting one of the divided voltages in accordance with a predetermined set value, wherein the selected divided voltage is a second regulated voltage that is in accordance with the input level of the external device, and supplying the second regulated voltage to the output circuit with.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
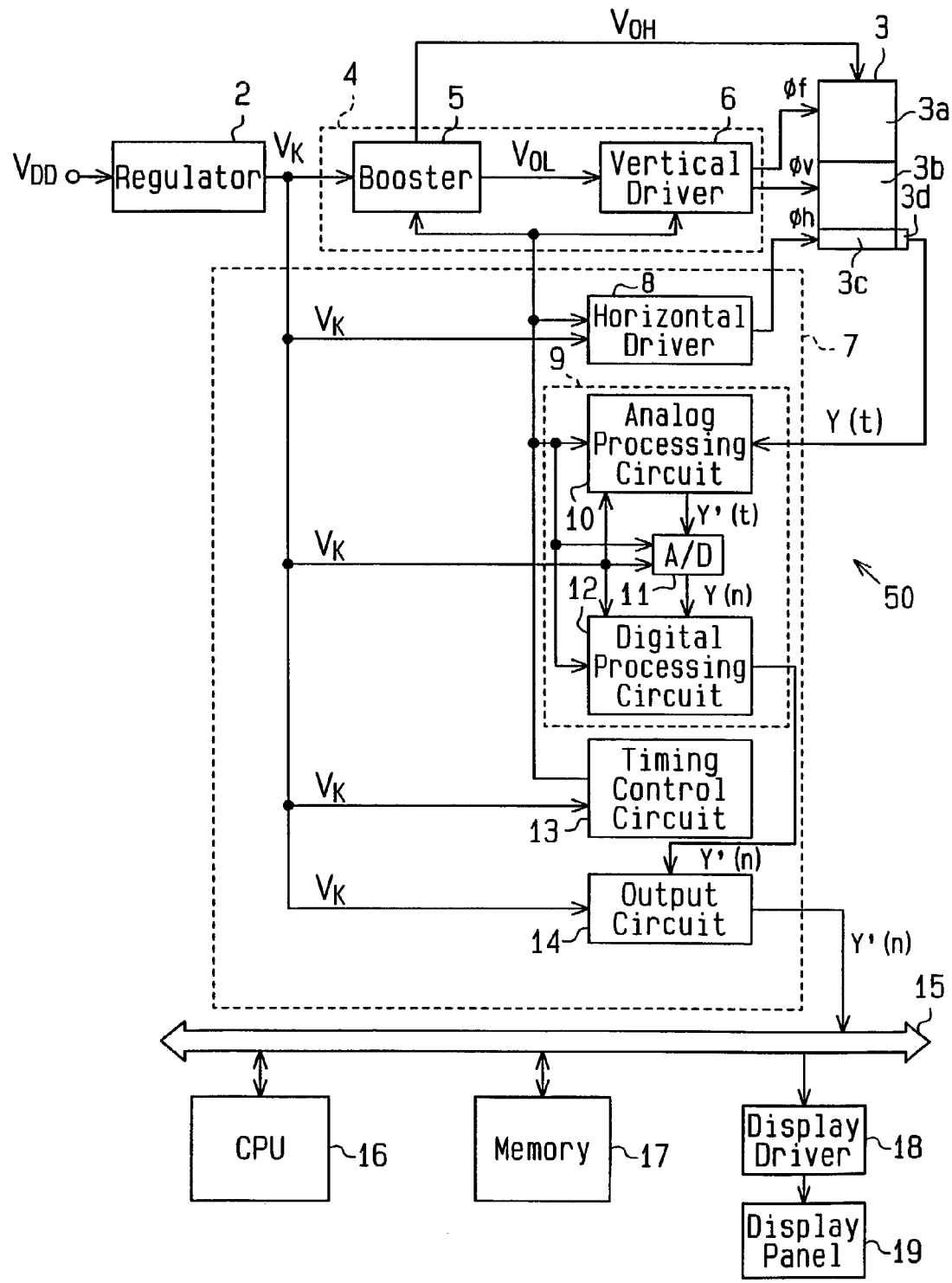
FIG. 1 is a schematic block diagram of a prior art imaging apparatus.

In the drawings, like numerals are used for like elements throughout.

Figure 2:
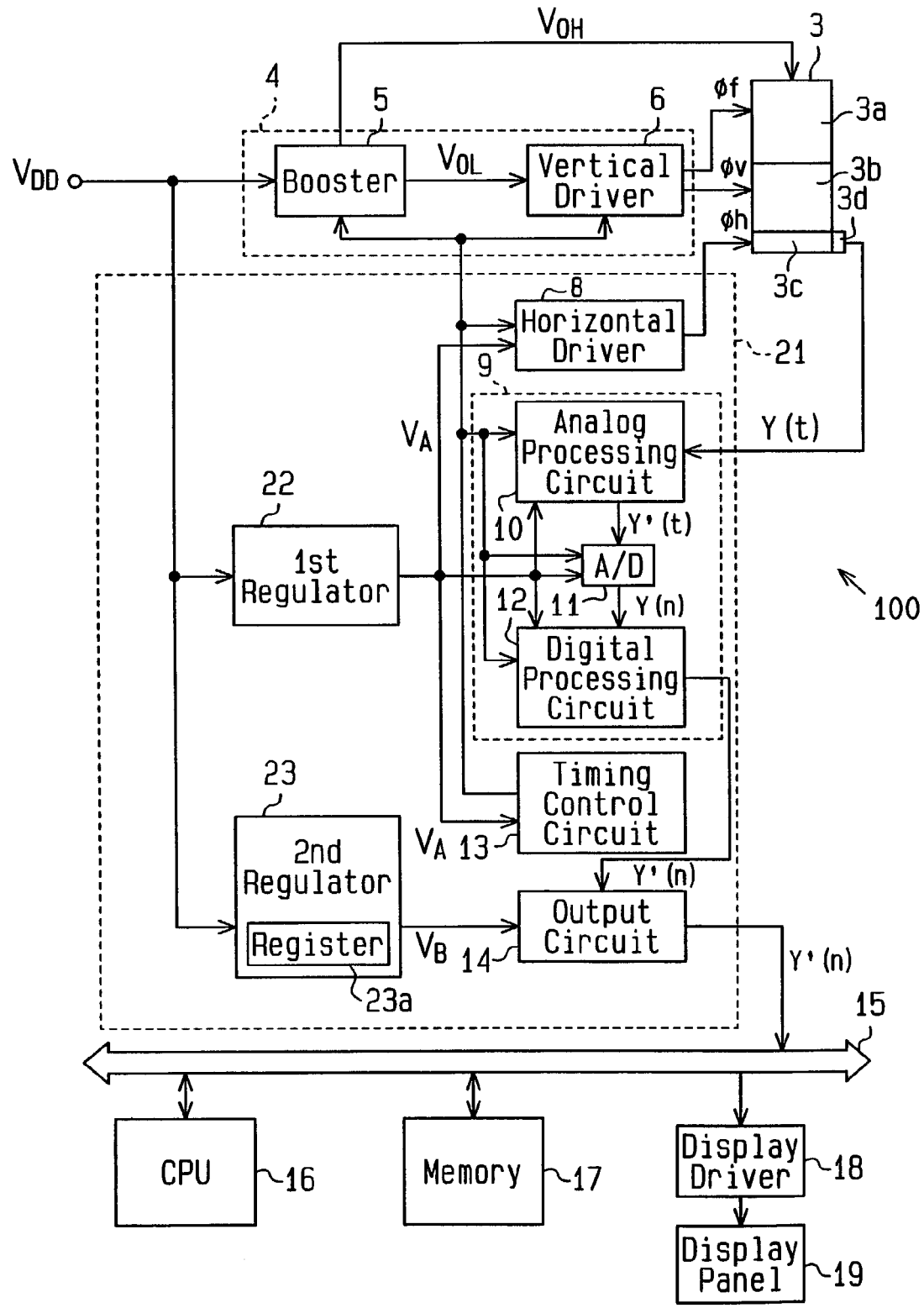
FIG. 2 is a schematic block diagram of an imaging apparatus having an image signal processor according to a first embodiment of the present invention.

FIG. 2 is a schematic block diagram of an imaging apparatus 100 having an image signal processor 21 according to a first embodiment of the present invention. The signal processor 21 of the first embodiment includes a horizontal driver 8, a signal processing circuit 9, a timing control circuit 13, and an output circuit 14. The signal processor 21 performs a predetermined signal process on the image signals Y(t) provided from a CCD image sensor 3 to generate image data signal Y'(n), which includes a luminance signal and a chrominance signal. The image data signal Y'(n) is provided to an external device including a CPU 16, a memory 17, or a display driver 18. Further, the signal processor 21 includes a first regulator 22 and a second regulator 23. The first regulator 22 is connected to the horizontal driver 8, the signal processing circuit 9, and the timing control circuit 13. The second regulator 23 is connected to the output circuit 14.

The feature of the present invention is in that the first and second regulators 22, 23 supply the horizontal driver 8, the signal processing circuit 9, the timing control circuit 13, and the output circuit 14 with regulated voltages corresponding to the optimum operation voltage of each circuit. A further feature of the present invention is in that a second regulated voltage, which is generated by the second regulator 23, is variable. That is, the second regulated voltage is shifted in accordance with a change in the input level of the external device.

The first and second regulators 22, 23 are supplied with power supply voltage VDD from a battery (not shown) via a power supply terminal. The first regulator 22 generates a first regulated voltage VA, which is substantially the same as the optimum operational voltage (e.g., 2.0 to 2.5V) of the horizontal driver 8 and the signal processing circuit 9. The second regulator 23 generates the second regulated voltage VB (i.e., the voltage corresponding to the input level of the external device), which is substantially equal to the optimum operational voltage of the output circuit 14, with the power supply voltage VDD. A plurality of regulated voltages are set in a stepped manner in the second regulator 23. The second regulator 23 functions to select one of the regulated voltages in accordance with a change of the external device. The regulated voltages are each set beforehand in accordance with the input level of each of the external devices that may be connected to a system bus 15. The second regulator 23 includes a register 23a, which stores a set value S for determining the regulated voltage.

To shift the regulated voltage in accordance with a change of the external device, the second regulator 23 operates in the following manner. When a change of the external device occurs, the CPU 16 provides the signal processor 21 with a signal (not shown) indicating the operational voltage of the external device subsequent to the change or the operating condition such as the operational timing subsequent to the change. Further, the operating conditions of each circuit in the signal processor 21 are initialized. In this state, the register 23a of the second regulator 23 outputs the set value S in accordance with the signal indicating the operating condition of the external device. The second regulated voltage VB, which corresponds to the input level of the external device subsequent to the change, is generated in accordance with the set value S.

In the first embodiment, the second regulated voltage, which is supplied to the output circuit 14, is shifted in accordance with a change of the input level of the external device. Accordingly, a change of the external device is flexibly coped with without having to provide a plurality of regulators. When the signal processor 21 incorporates the first and second regulators 22, 23 and the first and second regulators 22, 23 are formed on a single chip of a semiconductor substrate, manufacturing costs are prevented from being increased without having to change the signal processor 21 itself even when the external device is changed.

The signal processor 21 operates in the following manner. It is assumed here that there is no change of the external device and that the second regulated voltage VB has already been determined. When the battery supplies the imaging apparatus 100 with the power supply voltage VDD (e.g., 3.2V), the power supply voltage VDD is supplied to the first and second regulators 22, 23.

The first regulator 22 converts the power supply voltage VDD to a first regulated voltage VA (e.g., 2.0V to 2.5V), which is optimal for the horizontal driver 8 and the signal processing circuit 9. The first regulated voltage VA is supplied to the horizontal driver 8 and the signal processing circuit 9. Thus, the horizontal driver 8 and the signal processing circuit 9 operates with the first regulated voltage VA. The second regulator 23 converts the power supply voltage VDD to a second regulated voltage VB (e.g., 2.9V), which is in accordance with the input level of the external device. The second regulated voltage VB is supplied to the output circuit 14. Thus, the output circuit 14 operates with the regulated voltage VB.

In the signal processor 21 of the first embodiment, the first and second regulators 22, 23 respectively and independently supply the signal processing circuit 9 and the output circuit 14 with the regulated voltages. Thus, the signal processing circuit 9 and the output circuit 14 are each operated by an optimal power supply voltage. As a result, unnecessary power is not consumed. This reduces power consumption. Further, the output voltages of the regulators 22, 23 are set at the optimal voltages of the associated signal processing circuit 9 and the output circuit 14. Thus, the signal processing circuit 9 and the output circuit 14 are each supplied with the optimal operational voltage. This improves the operational characteristics of the signal processing circuit 9 and the output circuit 14.

Figure 3:
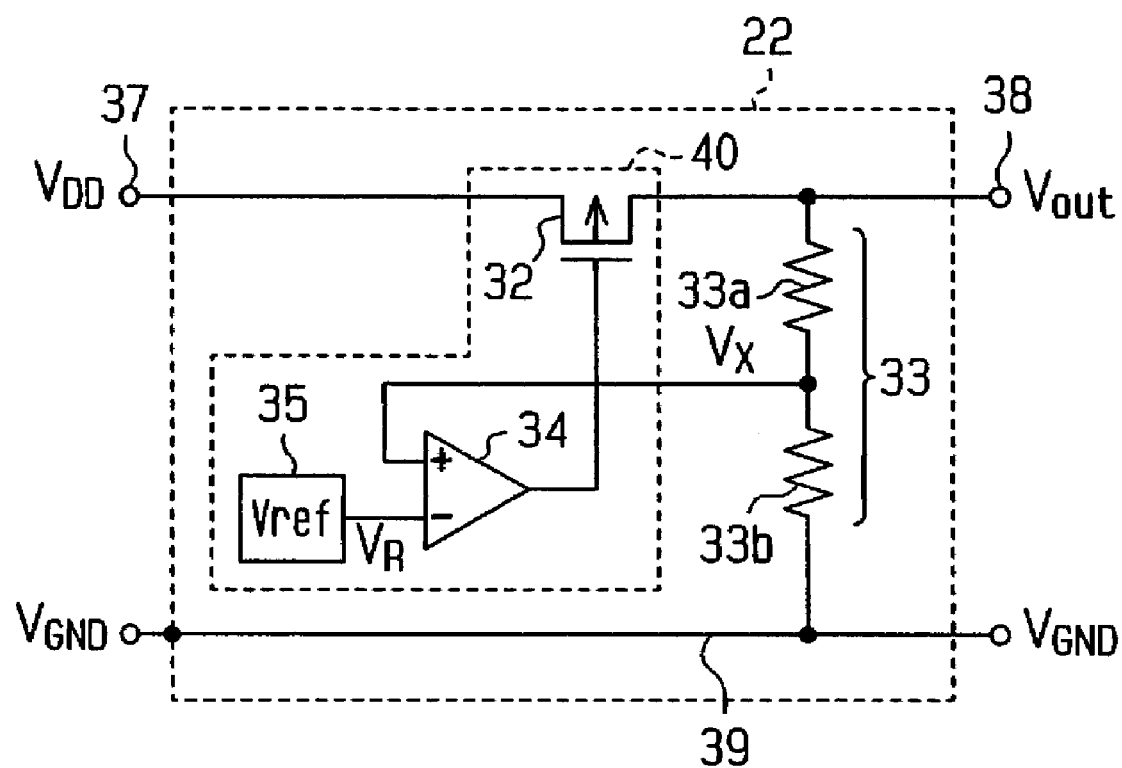
FIG. 3 is a schematic circuit diagram of a first regulator of the image signal processor of FIG. 2.
Figure 4:
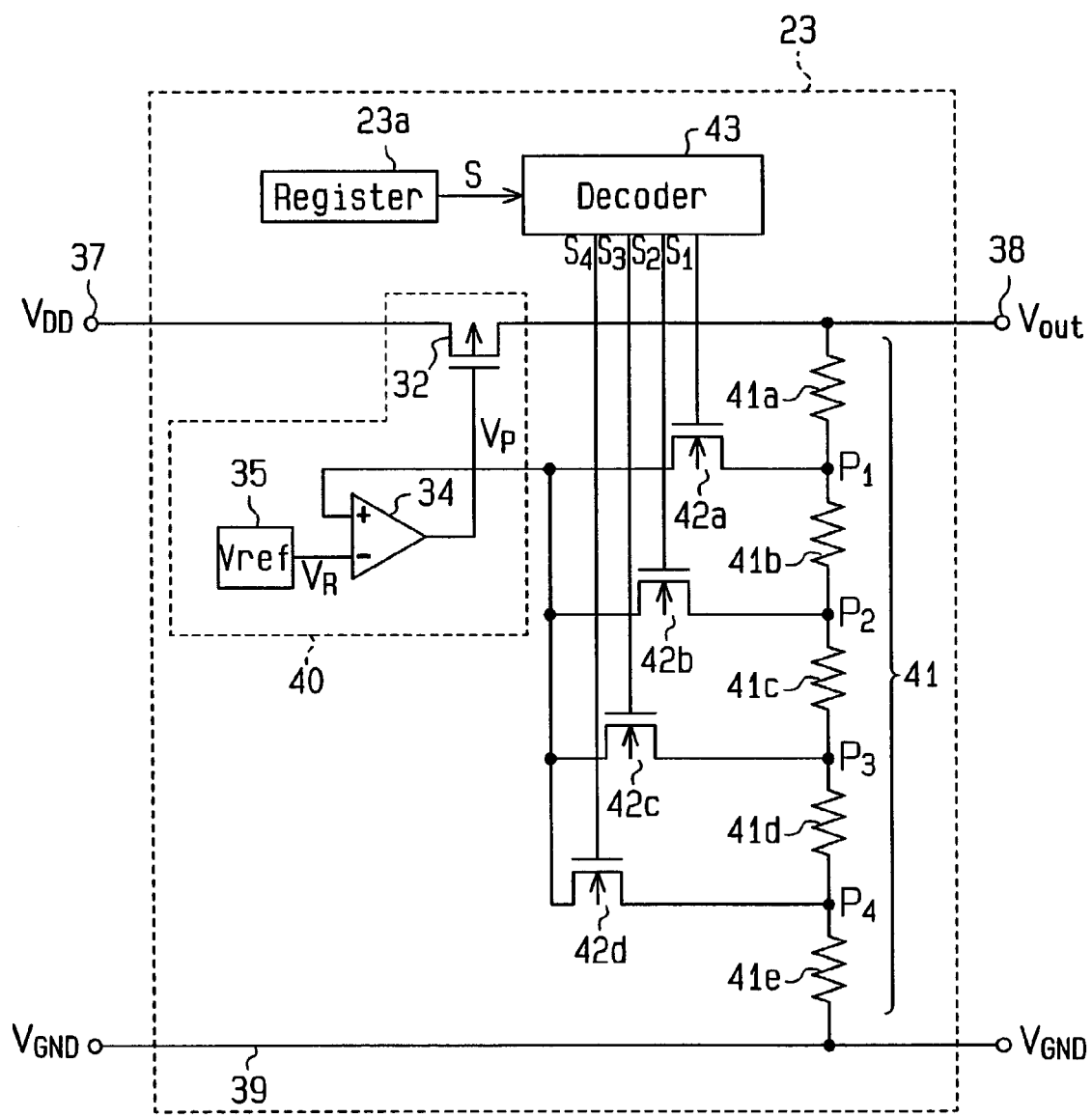
FIG. 4 is a schematic block diagram of an imaging apparatus having an image signal processor according to a second embodiment of the present invention.

FIG. 3 is a schematic circuit diagram of the first regulator 22. The first regulator 22 includes a p-channel transistor 32, a resistor string 33, a comparator 34, and a reference voltage generation circuit 35.

The p-channel transistor 32 is connected between a power supply terminal 37 and an output terminal 38. The gate of the p-channel transistor 32 is connected to the output terminal of the comparator 34. The resistor string 33 includes resistors 33a, 33b, which are connected in series between the drain of the p-channel transistor 32 and a ground line 39. The median point between the resistor 33a and the resistor 33b is connected to a non-inverting terminal of the comparator 34. The reference voltage generation circuit 35 is connected to an inverting input terminal of the comparator 34.

The first and second regulators 22, 23 operate in the following manner. The resistances of the resistor 33a and the resistor 33b are represented by R1 and R2. When the power supply voltage VDD is supplied via the power supply terminal 37, the p-channel transistor 32 goes on and the power supply voltage VDD is supplied to the resistor string 33. The resistor string 33 divides the power supply voltage VDD and generates a divided voltage VX=(R2/(R1+R2))·VDD at the median point of the resistor string 33. The divided voltage VX is supplied to the non-inverting input terminal of the comparator 34.

Then, the comparator 34, which operates in accordance with the potential difference between the divided potential VX and the reference voltage VR, controls the ON resistance of the p-channel transistor 32 so that the divided voltage VX and the reference voltage VR are equalized.

More specifically, when the divided voltage VX is greater than the reference voltage VR, the comparator 34 causes the p-channel transistor 32 to go ON. When the divided voltage VX is less than the reference voltage VR, the comparator 34 causes the p-channel transistor 32 to go OFF. The first regulator 22 generates a constant voltage (regulated voltage) VOUT=((R1+R2)/R2)·VDD at the output terminal 38 based on the ratio of the resistances R1, R2 of the resistors 33a, 33b and the reference voltage VR of the reference voltage generation circuit 35.

In the first regulator 22, the dividing ratio of the resistor string 33 and the reference voltage VR are set in accordance with the optimum operational voltage of the signal processing circuit 9. This generates an optimum regulated voltage for the signal processing circuit 9.

FIG. 3 is a circuit diagram of the second regulator 23. The second regulator 23 includes a voltage regulation unit 40, which has a p-channel transistor 32, a comparator 34, and a reference voltage generation circuit 35. The second regulator 23 also includes a resistor string 41, four n-channel transistors 42a–42d, a decoder 43, and a register 23a. The decoder 43 and the n-channel transistors 42a–42d form a selection unit.

The voltage regulation unit 40 is connected between the power supply terminal 37 and the resistor string 41. The comparator 34 controls the ON resistance of the of the p-channel transistor 32 so that a divided voltage VP, which is generated by the resistor string 41, and a reference voltage VR, which is generated by the reference voltage generation circuit 35, are substantially equalized. The resistor string 41 includes a plurality of series-connected resistors 41a41e. The four n-channel transistors 42a–42d are respectively connected between four nodes P1–P4, which are located between the resistors 41a–41e, and the non-inverting input terminal of the comparator 34. The register 23a prestores a plurality of the set values. The decoder 43 provides the gates of the four n-channel transistors 42a–42d with control signals S1–S4, respectively, in accordance with each set value S. The set value S is set in accordance with the input level of the external device at, for example, two bit digital values (0, 0), (0, 1), (1, 0), or (1, 1). The control signals S1–S4 are decoded to four bit digital values (1, 0, 0, 0), (0, 1, 0, 0), (0, 0, 1, 0), or (0, 0, 0, 1) based on the set value S. The "1" of the control signals S1–S4 is associated with, for example, a high level, and the "0" is associated with a low level. In this manner, the four n-channel transistors 42a–42d are activated and de-activated in response to the control signals S1–S4, and the nodes P1–P4 are selectively connected to the non-inverting input terminal of the comparator 34.

The operation of the second regulator 23 will now be discussed. When a change of the external device occurs, the CPU 16 provides the signal processor 21 with a signal (not shown) indicating the operating condition of the external device subsequent to the change, such as the operational voltage of the external device or the operational timing of the external device. Further, the operating conditions of each circuit in the signal processor 21 are initialized. In this case, the register 23a outputs the set value S in accordance with the signal indicating the operating condition of the external device. The decoder 43 decodes the set value S and provides the control signals S1–S4 to the gates of the four transistors 42a–42d.

Then, the transistors 42a–42d selectively become conductive in response to the control signals S1–S4. This connects one of the nodes P1–P4 with the non-inverting input terminal of the comparator 34. In this manner, a single divided voltage is selected from a plurality of divided voltages VP1–VP4, and the selected divided voltage VP is supplied to the comparator 34. The comparator 34 controls the ON resistance of the p-channel transistor 32 so that the selected divided voltage VP and the reference voltage VR, which is supplied from the reference voltage generation circuit 35, are substantially equalized. Thus, a second regulated voltage VB, which is in accordance with the input level of the changed external device, is generated.

Since the second regulator 23 selects one of the divided voltages VP1–VP4, which differ from one another, at the nodes P1–P4, the second regulated voltage VB is variably controlled. That is, change of the external device is coped with by setting the resistance of each of the resistors 41a–41e in accordance with the input level of each of the external devices, which may be connected to the signal processor.

In the first embodiment, the first and second regulators 22, 23 are arranged in the signal processor 21 and formed on the same semiconductor substrate as the signal processor 21. Accordingly, the first and second regulators 22, 23 are manufactured simultaneously with other circuits in the signal processor 21. This suppresses costs and improves the manufacturing yield.

Figure 5:
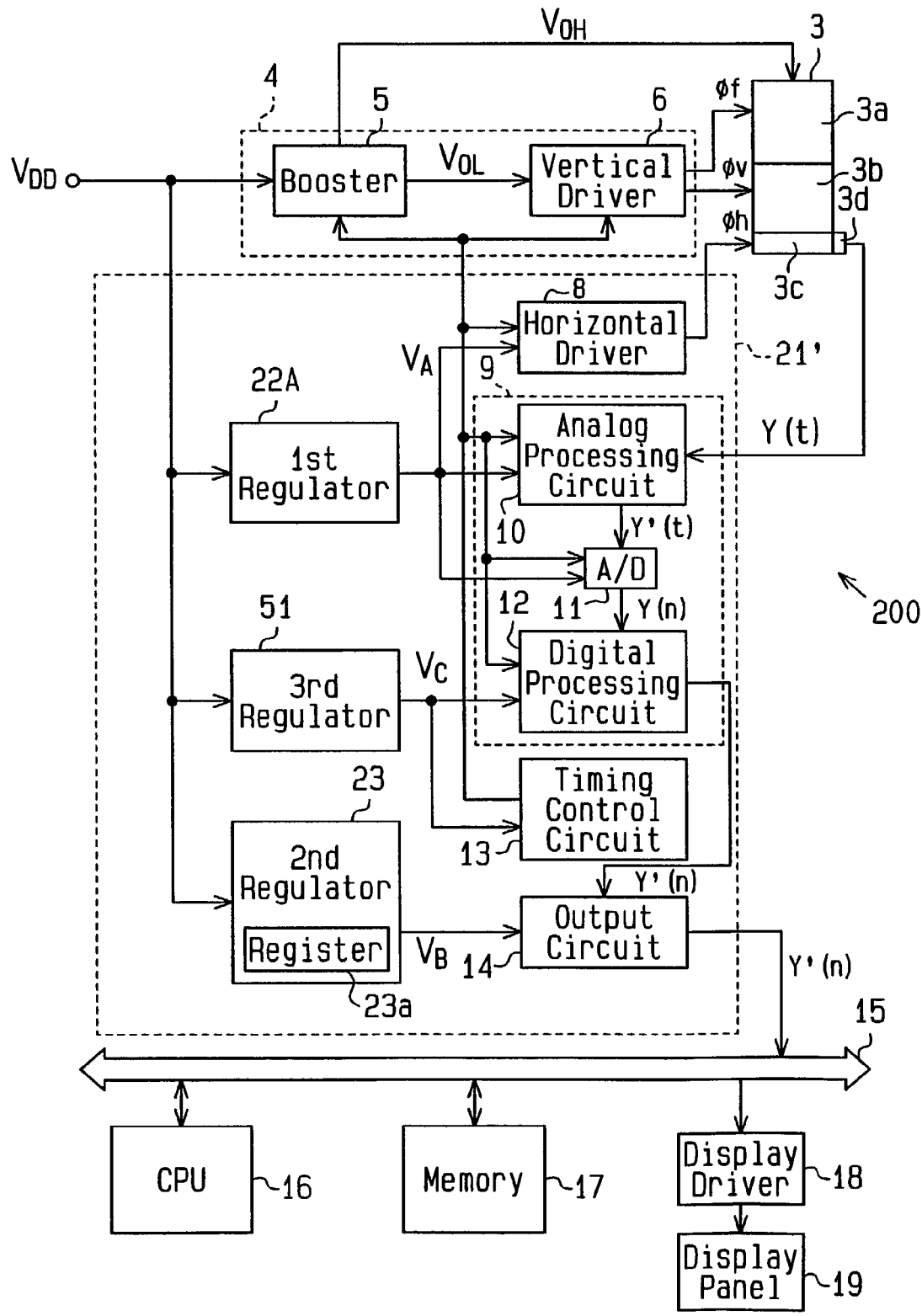
FIG. 5 is a schematic block diagram of an imaging apparatus having an image signal processor according to a third embodiment of the present invention.

FIG. 5 is a schematic block diagram of an imaging apparatus 200 including a signal processor 21' according to a second embodiment of the present invention.

The signal processor 21' includes a horizontal driver 8, a signal processing circuit 9, a timing control circuit 13, an output circuit 14, and three regulators 22A, 23, 51. The first regulator 22A is connected to an analog processing circuit 10 and an A/D converter 11. The second regulator 23 is connected to the output circuit 14. The third regulator 51 is connected to a digital processing circuit 12 and a timing control circuit 13.

The first regulator 22A is supplied with power supply voltage VDD from a battery (not shown) to generate a first regulated voltage VA, which is substantially equal to the optimum operational voltage (e.g., 2.5V) of the analog processing circuit 10 and the A/D converter 11. The second regulator 23 is supplied with the power supply voltage VDD from the battery and generates a second regulated voltage VB, which is substantially equal to the optimal operational voltage of the output circuit 14. The second regulated voltage VB, which corresponds with the input level of the external device, is greater than the first regulated voltage VA.

The second regulator 23 shifts the second regulated voltage in accordance with a change of the input level of the external device.

The third regulator 51 is supplied with the power supply voltage VDD from the battery to generate a third regulated voltage VC, which is substantially equal to the optimum operational voltage (e.g., 2.0V) of the digital processing circuit 12 and the timing control circuit 13. The third regulated voltage VC is less than the first regulated voltage VA.

In this manner, by providing the analog processing circuit 10 with the first regulator 22A and the digital processing circuit 12 with the third regulator 51, the analog processing circuit 10 and the digital processing circuit 12 are each supplied with the optimum power supply voltage. This improves the signal processing characteristics of the analog processing circuit 10 and the digital processing circuit 12. Further, the third regulator 51 independently supplies the digital processing circuit 12 with the third regulated voltage VC, which is less than the first regulated voltage VA. This reduces the power consumption of the digital processing circuit 12.

Figure 6:
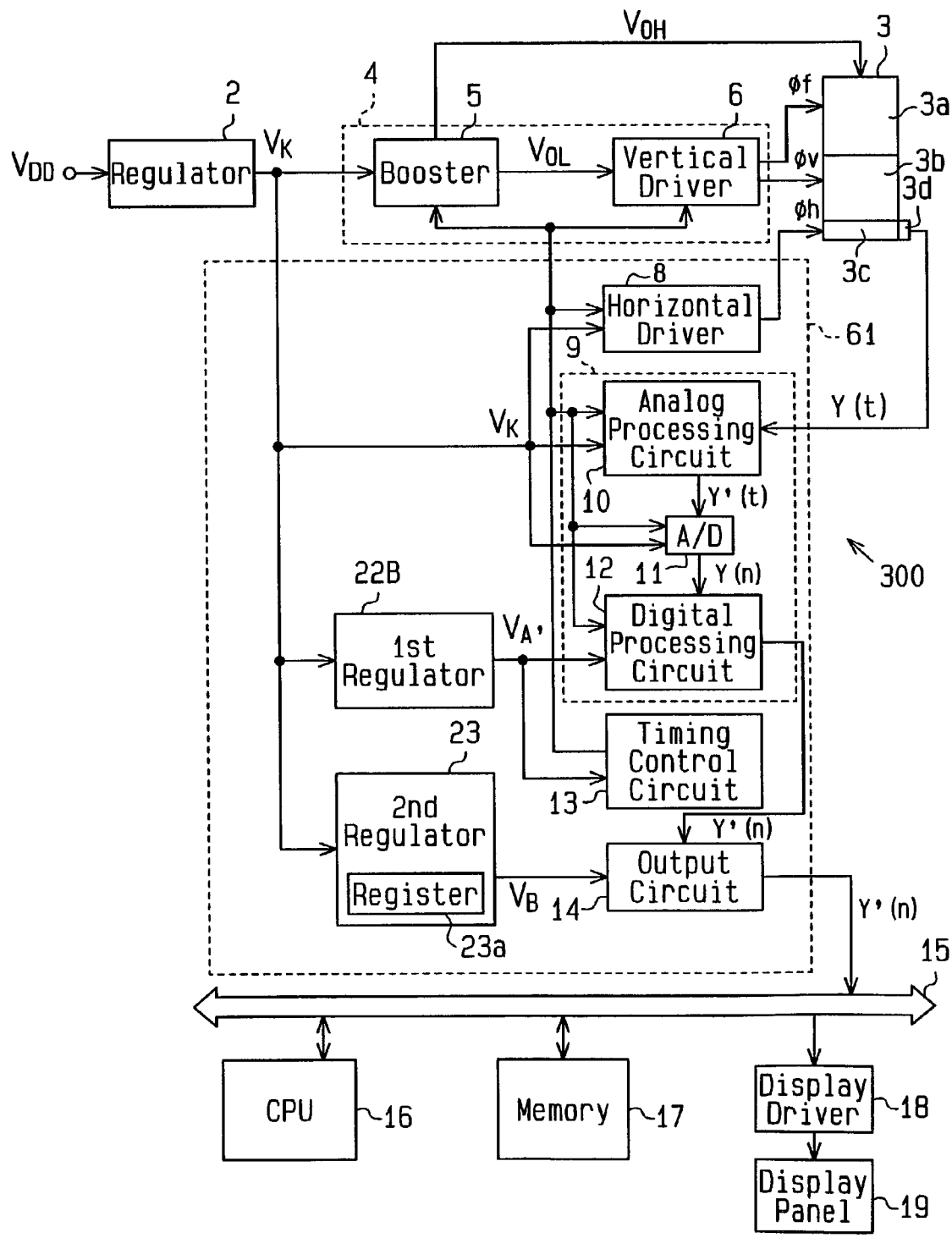
FIG. 6 is a schematic block diagram of an imaging apparatus having an image signal processor according to a fourth embodiment of the present invention.

FIG. 6 is a schematic block diagram of an imaging apparatus 300 including a signal processor 61 according to a third embodiment of the present invention.

In the third embodiment, the imaging apparatus 300 employs an external regulator 2 in lieu of the first regulator 22A of FIG. 5. The external regulator 2, which is supplied with the power supply voltage VDD, supplies a regulated voltage VK to the horizontal driver 8, the analog processing circuit 10, and the A/D converter 11.

In the third embodiment, the regulated voltage VK is substantially equalized with the optimum operational voltage (e.g., 2.5V) of the horizontal driver 8, the analog processing circuit 10, and the A/D converter 11. The regulated voltage VK is the power supply voltage of the signal processor 61.

The signal processor 61 includes a first regulator 22B, which is connected to a digital processing circuit 12 and a timing control circuit 13. Further, the signal processor 61 includes a second regulator 23, which is connected to the output circuit 14.

The first regulator 22B receives the regulated voltage VK from the external regulator 2 and generates a first regulated voltage VA', which is substantially equal to the optimum operational voltage (e.g., 2.0V) of the digital processing circuit 12 and the timing control circuit 13.

The second regulator 23 includes a register 23a, which stores plural pieces of voltage value data that are set in a stepped manner, and generates one of a plurality of regulated voltages based on the voltage value data. That is, one of the plurality of regulated voltages is selected, and the selected voltage is generated as a second regulated voltage VB. The second regulator 23 has a characteristic in that it drops the input voltage. Thus, the regulated voltages are set in a voltage range that is less than the regulated voltage VK of the external regulator 2.

In the third embodiment, each circuit in the signal processor 61 is supplied with the optimum power supply voltage. Further, the voltage supplied to the output circuit 14 is varied in accordance with a change of the input level of the external device. This improves the operational characteristics of the signal processor 61, reduces power consumption, and suppresses costs.

It should be apparent to those skilled in the art that the present invention may be embodied in many other specific forms without departing from the spirit or scope of the invention. Particularly, it should be understood that the present invention may be embodied in the following forms.

In each embodiment, the operational voltage supplied to the horizontal driver 8 may be varied in accordance with, for example, the specification of the CCD image sensor 3. For example, if the optimum operational voltage of the horizontal driver 8 is closer to the operational voltage of the digital processing circuit 12 and the timing control circuit 13 than the operational voltage of the analog processing circuit 10 and the A/D converter 11, the horizontal driver 8 may be supplied with substantially the same voltage as the digital processing circuit 12 and the timing control circuit 13.

The present examples and embodiments are to be considered as illustrative and not restrictive, and the invention is not to be limited to the details given herein, but may be modified within the scope and equivalence of the appended claims.

What is claimed is:

1. An image signal processor for performing a predetermined signal processing on a first image signal, which is generated by a solid-state imaging device, and generating a second image signal, which is provided to an external device and complies with a predetermined format, the image signal processor comprising:
   a first regulator supplied with a power supply voltage to generate a first regulated voltage, which is in accordance with an output level of the solid-state imaging device;
   a second regulator supplied with the power supply voltage to generate a second regulated voltage, which corresponds to an input level of the external device, wherein the second regulator shifts the second regulated voltage in accordance with the input level of the external device;
   a signal processing circuit connected to the solid-state imaging device and the first regulator, for operating with the first regulated voltage, wherein the signal processing circuit performs the predetermined signal processing on the first image signal and generates the second image signal; and
   an output circuit connected to the second regulator, the signal processing circuit, and the external device, for operating with the second regulated voltage, wherein the output circuit receives the second image signal from the signal processing circuit and provides the second image signal to the external device, wherein the first regulated voltage is less than the power supply voltage.

2. An image signal processor for performing a predetermined signal processing on a first image signal, which is generated by a solid-state imaging device, and generating a second image signal, which is provided to an external device and complies with a predetermined format, the image signal processor comprising:
   a first regulator supplied with a power supply voltage to generate a first regulated voltage, which is in accordance with an output level of the solid-state imaging device;
   a second regulator supplied with the power supply voltage to generate a second regulated voltage, which corresponds to an input level of the external device, wherein the second regulator shifts the second regulated voltage in accordance with the input level of the external device;
   a signal processing circuit connected to the solid-state imaging device and the first regulator, for operating with the first regulated voltage, wherein the signal processing circuit performs the predetermined signal processing on the first image signal and generates the second image signal; and
   an output circuit connected to the second regulator, the signal processing circuit, and the external device, for operating with the second regulated voltage, wherein the output circuit receives the second image signal from the signal processing circuit and provides the second image signal to the external device, wherein the second regulator generates a plurality of voltages and selects one of the voltages as the second regulated voltage in accordance with the input level of the external device.

3. The image signal processor according to claim 2, wherein the second regulator selectively generates one of the voltages as the second regulated voltage in accordance with the input level of the external device.

4. An image signal processor for performing a predetermined signal processing on a first image signal, which is generated by a solid-state imaging device, and generating a second image signal, which is provided to an external device and complies with a predetermined format, the image signal processor comprising:

a first regulator supplied with a power supply voltage to generate a first regulated voltage, which is in accordance with an output level of the solid-state imaging device;

a second regulator supplied with the power supply voltage to generate a second regulated voltage, which corresponds to an input level of the external device, wherein the second regulator shifts the second regulated voltage in accordance with the input level of the external device;

a signal processing circuit connected to the solid-state imaging device and the first regulator, for operating with the first regulated voltage, wherein the signal processing circuit performs the predetermined signal processing on the first image signal and generates the second image signal; and an output circuit connected to the second regulator, the signal processing circuit, and the external device, for operating with the second regulated voltage, wherein the output circuit receives the second image signal from the signal processing circuit and provides the second image signal to the external device, wherein the second regulator includes:

a register for storing a set value set in accordance with the input level of the external device;

a resistor string having a plurality of resistors to divide the power supply voltage and generate a plurality of divided voltages;

a selection unit connected to the resistors to select one of the divided voltages in accordance with the set value; and a voltage regulation unit connected between the power supply voltage and the resistor string, wherein the voltage regulation unit is supplied with the selected divided voltage and controls the supply of the power supply voltage to the resistor string so that the selected divided voltage is substantially equalized with a predetermined reference voltage.

5. The image signal processor according to claim 4, wherein the selection unit includes a plurality of transistors connected between the voltage regulation unit and the resistors, wherein the transistors become selectively conductive in response to the set value.

6. An image signal processor for performing a predetermined signal processing on a first image signal, which is generated by a solid-state imaging device, and generating a second image signal, which is provided to an external device and complies with a predetermined format, the image signal processor comprising:

a first regulator supplied with a power supply voltage to generate a first regulated voltage, which is in accordance with an output level of the solid-state imaging device;

a second regulator supplied with the power supply voltage to generate a second regulated voltage, which corresponds to an input level of the external device, wherein the second regulator shifts the second regulated voltage in accordance with the input level of the external device;

a signal processing circuit connected to the solid-state imaging device and the first regulator, for operating with the first regulated voltage, wherein the signal processing circuit performs the predetermined signal processing on the first image signal and generates the second image signal;

an output circuit connected to the second regulator, the signal processing circuit, and the external device, for operating with the second regulated voltage, wherein the output circuit receives the second image signal from the signal processing circuit and provides the second image signal to the external device; and a third regulator supplied with the power supply voltage to generate a third regulated voltage;

wherein the signal processing circuit includes:

an analog processing circuit connected to the solid-state imaging device and the first regulator, for operating with the first regulated voltage, wherein the analog processing circuit performs a predetermined analog signal processing on the first image signal; and a digital processing circuit connected to the third regulator, for operating with the third regulated voltage, wherein the digital processing circuit performs a predetermined digital signal processing on a digital first image signal converted from the first image signal, which has undergone the analog signal processing, to generate the second image signal.

7. The image signal processor according to claim 6, wherein the third regulated voltage is less than the first regulated voltage.

8. An image signal processor for performing a predetermined signal processing on a first image signal, which is generated by a solid-state imaging device, and generating a second image signal, which is provided to an external device and complies with a predetermined format, the image signal processor comprising:

a first regulator supplied with a power supply voltage to generate a first regulated voltage, which is in accordance with an output level of the solid-state imaging device;

a second regulator supplied with the power supply voltage to generate a second regulated voltage, which corresponds to an input level of the external device, wherein the second regulator shifts the second regulated voltage in accordance with the input level of the external device;

a signal processing circuit connected to the solid-state imaging device and the first regulator, for operating with the first regulated voltage, wherein the signal processing circuit performs the predetermined signal processing on the first image signal and generates the second image signal; and an output circuit connected to the second regulator, the signal processing circuit, and the external device, for operating with the second regulated voltage, wherein the output circuit receives the second image signal from the signal processing circuit and provides the second image signal to the external device, wherein the signal processing circuit includes:

an analog processing circuit connected to the solid-state imaging device, for operating with the power supply voltage, wherein the analog processing circuit performs a predetermined analog signal processing on the first image signal; and a digital processing circuit connected to the first regulator, for operating with the first regulated voltage, wherein the digital processing circuit performs a predetermined digital signal processing on a digital first image signal converted from the first image signal, which has undergone the analog signal processing, to generate the second image signal.

9. A method for supplying power supply voltage to an image signal processor, wherein the image signal processor includes a signal processing circuit for performing a predetermined signal processing on a first image signal, which is generated by a solid-state imaging device, to generate a second image signal, which complies with a predetermined format, and an output circuit for receiving the second image signal from the signal processing circuit and providing the second image signal to the external device, the method comprising the steps of:

generating a first regulated voltage that is in accordance with an output level of the solid-state imaging device with the power supply voltage;

supplying the first regulated voltage to the signal processing circuit;

generating a plurality of divided voltages with the power supply voltage;

selecting one of the divided voltages in accordance with a predetermined set value, wherein the selected divided voltage is a second regulated voltage that is in accordance with the input level of the external device; and supplying the second regulated voltage to the output circuit.

10. The method according to claim 9, wherein the step for generating a plurality of divided voltages includes using a plurality of resistors to generate the divided voltages, the method further comprising the step of:

controlling the supply of power supply voltage to the resistors so that the selected divided voltage is substantially equalized with a predetermined reference voltage.

11. The method according to claim 9, wherein the signal processing circuit includes an analog processing circuit, which operates with the first regulated voltage to perform a predetermined analog signal processing on the first image signal, and a digital processing circuit, which performs a predetermined digital signal processing on a digital first image signal converted from the first image signal that has undergone the analog signal processing to generate the second image signal, the method further comprising the steps of:

generating a third regulated voltage with the power supply voltage; and supplying the third regulated voltage to the digital processing circuit.

12. The method according to claim 11, wherein the third regulated voltage is less than the first regulated voltage.

* * * * *

UNITED STATES PATENT AND TRADEMARK OFFICE
CERTIFICATE OF CORRECTION

PATENT NO. : 7,110,038 B2  Page 1 of 1
APPLICATION NO. : 10/208141
DATED : September 19, 2006
INVENTOR(S) : Tohru Watanabe, Takashi Tanimoto and Tatsuya Takahashi It is certified that error appears in the above-identified patent and that said Letters Patent is hereby corrected as shown below:

On the Title page item (*) Notice, after the Notice re patent term adjustment, please insert the following paragraph:

--This patent is subject to a terminal disclaimer.--

Signed and Sealed this

Eighth Day of July, 2008

JON W. DUDAS
*Director of the United States Patent and Trademark Office*